(12) United States Patent
Izak et al.

(10) Patent No.: US 12,438,574 B2
(45) Date of Patent: Oct. 7, 2025

(54) MOBILE DEVICE THAT PROCESSES DIFFERENT APPLICATIONS SHARING THE SAME ANTENNA

(71) Applicant: Renesas Design Austria GmbH, Graz (AT)

(72) Inventors: Jernej Izak, Graz (AT); Francesco Antonetti, Graz (AT)

(73) Assignee: Renesas Design Austria GmbH, Graz (AT)

( * ) Notice: Subject to any disclaimer, the term of this patent is extended or adjusted under 35 U.S.C. 154(b) by 0 days.

(21) Appl. No.: 19/101,344

(22) PCT Filed: May 15, 2023

(86) PCT No.: PCT/EP2023/062971
§ 371 (c)(1),
(2) Date: Feb. 5, 2025

(87) PCT Pub. No.: WO2024/027965
PCT Pub. Date: Feb. 8, 2024

(65) Prior Publication Data
US 2025/0260441 A1 Aug. 14, 2025

(30) Foreign Application Priority Data
Aug. 4, 2022 (EP) .................................. 22188740

(51) Int. Cl.
*H04B 5/79* (2024.01)
*G06Q 20/34* (2012.01)
(Continued)

(52) U.S. Cl.
CPC ............ *H04B 5/79* (2024.01); *G06Q 20/352* (2013.01); *H02J 50/12* (2016.02); *H03H 7/38* (2013.01); *H04B 5/48* (2024.01)

(58) Field of Classification Search
CPC ....................................................... H04B 5/79
See application file for complete search history.

(56) References Cited

U.S. PATENT DOCUMENTS 10,651,670 B1 *  5/2020  Jiang ...................... H02J 50/20
2012/0149301 A1   6/2012  Wiley
(Continued)

OTHER PUBLICATIONS

International Search Report and Written Opinion dated Jul. 6, 2023 issued in PCT/EP2023/062971.

*Primary Examiner* — David Bilodeau
(74) *Attorney, Agent, or Firm* — SCULLY, SCOTT, MURPHY & PRESSER, P.C.

(57) ABSTRACT

Mobile device (1) for wireless communication with another device in the HF frequency area, which mobile device comprises: a communication stage (3) with a communication unit (4) connected via a first matching unit with a first antenna to optimize for a load modulated communication with the other device; a charge stage (13) with a charge unit (14) connected via a second matching unit with a second antenna to optimize for wireless charging of a battery (2) of the mobile device (1), wherein that the first and second antennas are realized as only one single antenna (9) and that the communication stage (3) comprises a first switch stage (6) arranged in the path between the communication unit (4) and the single antenna (9) to connect or disconnect the communication unit (4) to/from the single antenna (9) and that the charge stage (13) comprises a second switch stage (16) arranged in the path between the charge unit (14) and the single antenna (9) to connect or disconnect the charge unit (14) to/from the single antenna (9) and that the mobile device (1) comprises a controller stage (19) connected to the first switch stage (6) and the second switch stage (16) to connect the communication unit (4) with and to disconnect the charge unit (14) from the single antenna (9) in a (Continued)

communication mode of the mobile device (1) and to connect the charge unit (14) with and to disconnect the communication unit (4) from the single antenna (9) in a charge mode of the mobile device (1).

6 Claims, 3 Drawing Sheets

(51) Int. Cl.
  *H02J 50/12* (2016.01)
  *H03H 7/38* (2006.01)
  *H04B 5/48* (2024.01)

(56) References Cited

U.S. PATENT DOCUMENTS

| 2016/0276877 | A1* | 9/2016 | Weale | H04B 5/72 |
| 2017/0098951 | A1* | 4/2017 | Olgun | H02J 50/12 |
| 2021/0250064 | A1* | 8/2021 | Wobak | H04B 5/48 |
| 2022/0231543 | A1* | 7/2022 | Tornambe | H04B 5/26 |

* cited by examiner

MOBILE DEVICE THAT PROCESSES DIFFERENT APPLICATIONS SHARING THE SAME ANTENNA

CROSS-REFERENCE TO RELATED APPLICATIONS

This application is a National Stage Entry under 35 U.S.C. § 371 of PCT International Application No. PCT/EP2023/062971 filed on May 15, 2023, which claims priority to EP Application No. 22188740.9 filed with the European Patent Office on Aug. 4, 2022, the entire contents of each of which are incorporated herein by reference.

FIELD OF THE INVENTION

The present invention relates to a mobile device to communicate with other devices in the HF frequency area, which mobile device comprises a communication stage with a communication unit connected via a first matching unit with a first antenna to enable a load modulated communication with the other devices and which mobile device furthermore comprises a charge stage with a charge unit connected via a second matching unit with a second antenna to enable wireless charging of a battery of the mobile device.

BACKGROUND OF THE INVENTION

There are mobile devices on the market like for instance the Samsung Galaxy Watch Active2 or the Samsung Galaxy Watch4 (SM-R870NZKKASIO) device which are smart watches to be worn on a person's wrist. Mobile devices like these smart watches comprises a communication stage that is realized by a dedicated payment communication integrated circuit connected via a first antenna matching unit to a first antenna to communicate at the frequency of 13.56 MHz. Some smart watches realize a payment application that complies with the Near Field Communication Standard ISO/IEC18000-3 to enable payments at point of sales reader devices. These smart watches furthermore comprises a charge stage that is realized by a dedicated charge integrated circuit connected via a second antenna matching unit to a second antenna to charge the battery of the smart watch with energy harvested from the electromagnetic field or HF field with the frequency of 13.56 MHz or other frequencies in the HF field like typically 100 to 300 kHz for Qi wireless charging. Some of these smart watches realize a proprietary system for wireless charging of the smart watch and for future charging applications a Wireless Charging Technical Specification has been released based on the NFC standard provided by the NFC Forum. Some of these wireless charging applications comprise a communication channel as well to communicate information related to wireless charging.

The communication application and the wireless charging application of the smart watch are different applications with complete different needs for the wireless transfer and HF field. For the communication application load modulation of the HF field is used by the smart watch and the communication stage with its first antenna in the HF field needs to have an impedance in the range of 5 to 10 Ohm to avoid that the HF field generated by the point of sales reader device is too much detuned by a too close or too large antenna of the mobile device. The resonance frequency should be different from the conventional 13.56 MHz and the antenna should resonate around 14 to 16 MHz for communication applications. Only for very small form factor antennas a resonance at the conventional 13.56 MHz would be possible without too much detuning of the antenna of the mobile device. This is a requirement of the relevant specification and ensures that the point of sales reader device emits the magnetic field with the specified carrier frequency. For the wireless charging application the mobile device needs to harvest as much power from the HF field as possible to charge the internal battery. To achieve that, the charge stage with its second antenna needs to have a very low impedance in the HF field and the second antenna needs to be tuned by the second matching circuit at a resonance frequency ident to the carrier frequency of the magnetic field. These different impedances and for most applications also different resonance frequencies of the first and second antenna in the HF field for the different applications define the need for different matching circuits for the first and second matching unit to ensure, that the first antenna and the second antenna both work optimized for the different applications.

It is quite a disadvantage for a small device, like a smart wrist watch, to realize two different antennas and two different matching circuits in the limited volume of the wrist watch available. This increases the technical complexity and costs for such mobile devices. Furthermore, these two antennas influence each other in the HF field, what reduces the possible efficiency.

Document US 2012/0149301 A1 discloses a mobile device for wireless communication with another device and to enable a charge application to charge a battery of the mobile device based on a magnetic field with two different specified carrier frequencies in the HF frequency area. A frequency detector detects either the first carrier frequency of 13.56 MHz and switches to the communication application or detects the second carrier frequency of 6.78 MHz and switches to the charge application. For both applications a separate matching unit is realized.

SUMMARY OF THE INVENTION

It is an object of the invention to provide a mobile device that realizes an optimized wireless communication application and a wireless charging application with less volume consumption in the mobile device and higher efficiency.

This object is achieved with a mobile device according to claim 1. In a first step, the concept was defined to realize the first and second antennas as only one single antenna. To achieve that a clever inventive way had to be found how it still could be achieved that the single antenna is matched either to the communication unit or the charge unit with their different impedances at the ports to enable the resonance operation mode for the wireless charging application. This was achieved by a communication stage that comprises a first switch stage arranged in the path between the communication unit and the single antenna to connect or disconnect the communication unit to/from the single antenna and by a charge stage that comprises a second switch stage arranged in the path between the charge unit and the single antenna to connect or disconnect the charge unit to/from the single antenna. A controller stage of the mobile device is connected to the first switch stage and the second switch stage to connect the communication unit with and to disconnect the charge unit from the single antenna in a communication mode of the mobile device and to connect the charge unit with and to disconnect the communication unit from the single antenna in a charge mode of the mobile device. In that way the controller stage not only switches between the communication unit and the charge unit depending of the mode/application to be processed, but at the same time enables that the appropriate matching unit is used to enable the resonance operation mode at the carrier frequency of the magnetic field for the wireless charging application and a resonance operation mode at a different frequency for the communication application.

In a preferred embodiment, the first matching unit and the second matching unit are realized with at least one capacity in common, what reduces the number of electrical components needed. Furthermore, at least one capacity of the matching unit that is just not used in the mode activated by the controller unit may be used for the matching unit that is just used in the activated mode. This is realized by a short circuit of the ports of the communication unit or charge unit not activated. All these measures enable to reduce the volume needed in the mobile device to realize these two applications.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
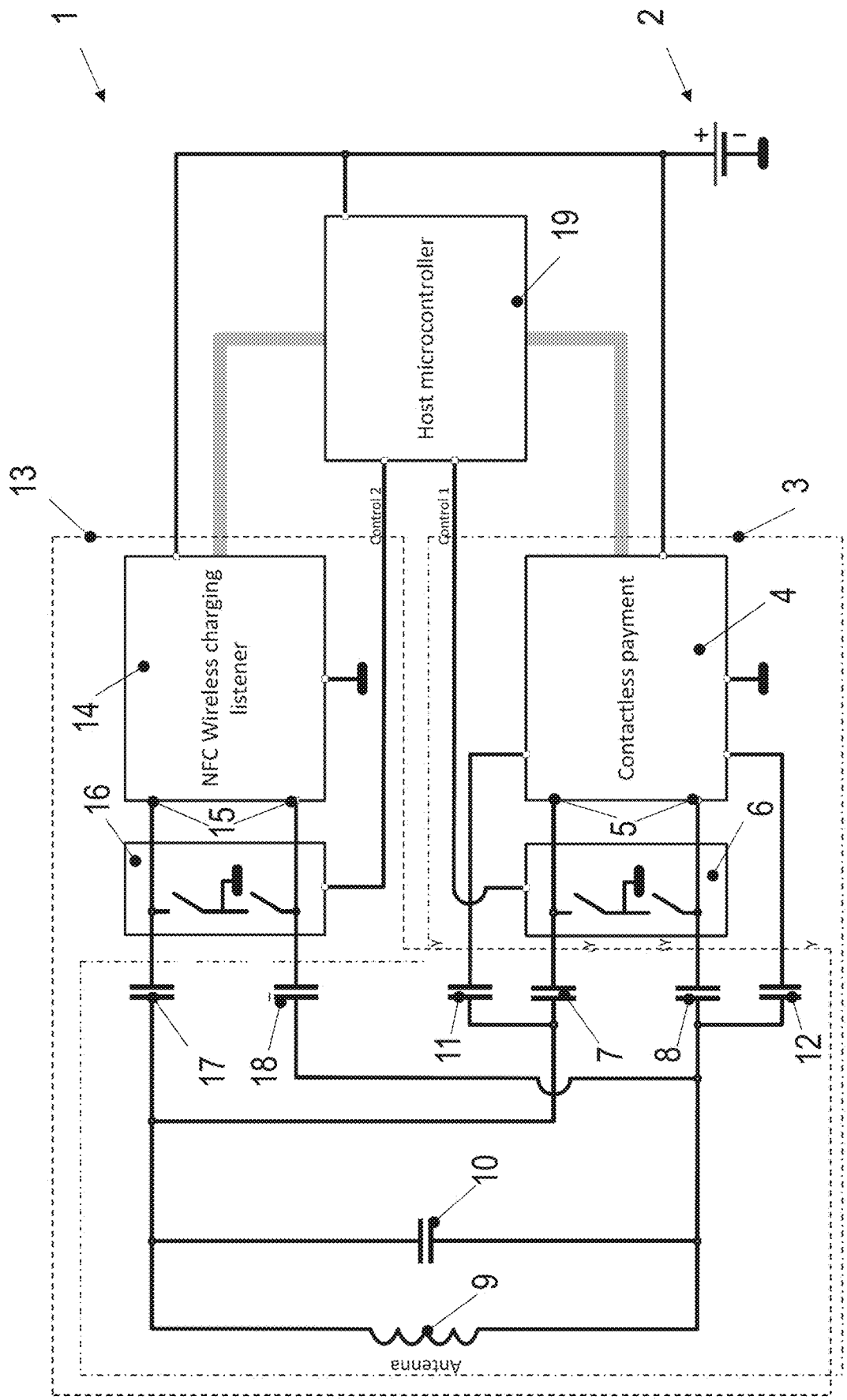
FIG. 1 shows a mobile device according to a preferred embodiment of the invention.

FIG. 1 shows a mobile device 1 to wirelessly communicate with other devices via an magnetic field with a carrier frequency of 13.56 MHz. Such a communication is for instance know from standards like ISO14.443 or ISO15.693. Other frequencies in the HF frequency area could be used as well. The mobile device 1 could be a mobile phone or smart wrist watch or any other mobile smart device, that combines the features to enable a wireless communication application with another device and to enable a charge application to charge a battery 2 of the mobile device 1.

Mobile device 1 comprises a communication stage 3 with a communication unit 4, which is realized as integrated circuit that processes all protocols and signal processing and security handling with a secure element needed to enable a contactless payment application. A person skilled in the art knows such integrated circuits for payment applications like e.g. the integrated circuit SECORA™ Connected from company Infineon sold on the market. The communication unit 4 is connected to battery 2 and comprises two output ports 5 connected to a first switch stage 6, which connects via two series capacities 7 and 8 to the single antenna 9 of the mobile device 1. A parallel capacity 10 is arranged parallel to the antenna 9 and additional capacities 11 and 12 connect from the communication unit 4 with antenna 9.

Mobile device 1 furthermore comprises a charge stage 13 with a charge unit 14, which is realized as integrated circuit that processes all protocols and signal processing needed to enable a wireless charging application. A person skilled in the art knows such a charge stage realized with different integrated circuits like the "NFC Wireless Charging System" disclosed by company Panthronics on their Internet page (https://www.panthronics.com/nfc-wireless-charging-system-solutions/). Charge unit 14 is connected to battery 2 and comprises two output ports 15 connected to a second switch stage 16, which connects via two series capacities 17 and 18 to the sole antenna 9 of the mobile device 1.

The mobile device 1 furthermore comprises a controller stage 19 connected to the first switch stage 6 and the second switch stage 16 and realized as host microcontroller. The software processed by the controller stage 19 enables that the controller stage 19 connects the communication unit 4 with the antenna 9 and disconnects the charge unit 14 from the antenna 9 in a communication mode of the mobile device 1. The controller stage 19 furthermore connects the charge unit 14 with the antenna 9 and disconnects the communication unit 4 from the antenna 9 in a charge mode of the mobile device 1.

Figure 2:
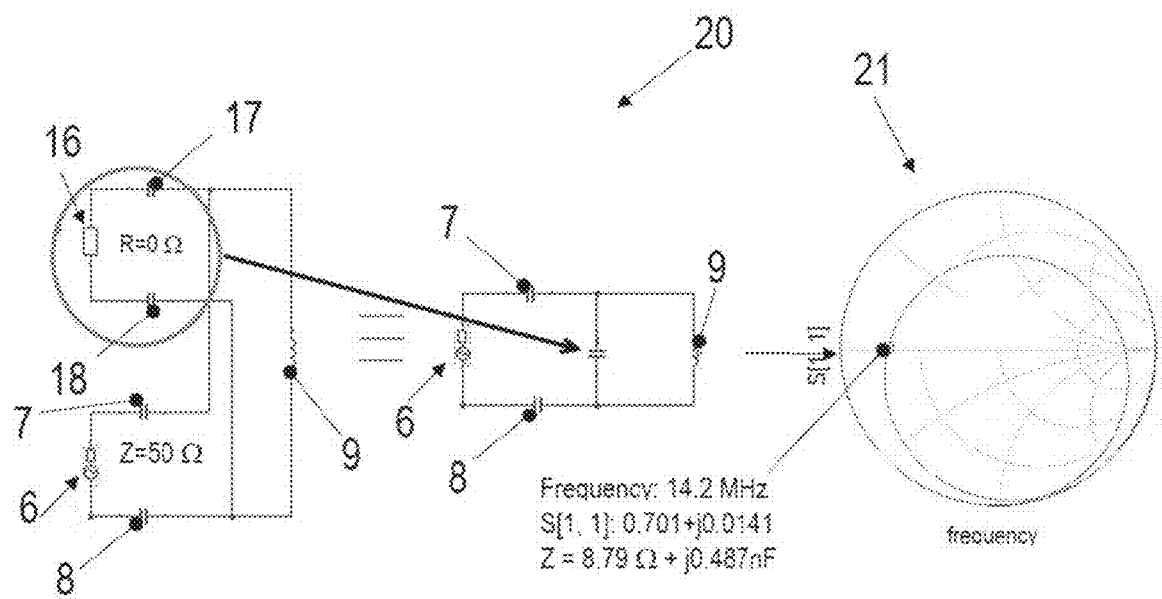
FIG. 2 shows a principle circuit drawing of the first matching circuit connected to the single antenna in the communication mode of the mobile device of FIG. 1.

The functionality of the mobile device 1 in the communication mode and in the charge mode will now be explained based on the FIGS. 1 to 3. If the user of the mobile device 1 moves the mobile device 1 into the HF field of a point of sales terminal to process a payment, controller stage 19 activates the communication mode with control signals to the first switch stage 6 and the second switch stage 16. The first switch stage 6 is opened by the control signal to connect the ports 5 with antenna 9 and second switch stage 16 is closed by the control signal to short circuit the ports 15. By this short circuit, series capacities 17 and 18 form one capacity parallel to antenna 9 and parallel to capacity 10 as can be seen in FIG. 2. The first matching unit in the communication mode of the mobile device 1 therefore is built by series capacities 17 and 18 parallel to capacity 10 (not shown in FIG. 2) and antenna 9, which is contacted with ports 5 via series capacities 7 and 8 and with additional capacities 11 and 12 to communication unit 4. In this communication mode, series capacities 17 and 18 of the second matching unit are used as part of the first matching unit and ensure that the first matching unit is built to tune the antenna 9 at a resonance frequency different than the carrier frequency. In this embodiment antenna 9 is tuned by the first matching unit at a resonance frequency of e.g. 14.2 MHz. Antenna 9 of mobile device 1 is realized with a normal (not particular small) form factor and the fact that the first matching unit is built to tune the antenna 9 at a resonance frequency different than the carrier frequency avoids too much detuning of the antenna 9, what is a big advantage. In this way communication stage 3 is optimized for a load modulated communication with the sales terminal and other devices.

Therefore, FIG. 2 shows in a principle circuit drawing 20 how series capacities 17 and 18 of mobile device 1 of FIG. 1 with the short circuit of the second switch stage 16 (R=0) form a parallel capacity to antenna 9. Frequency diagram 21 shows the complex impedance of the antenna 9 of mobile device 1 in its communication mode, which is just as one example with the value $Z=8.79\Omega+j0.487$ nF. This impedance does not load the HF field of the sales terminal too much and ensures that the antenna of the point of sales terminal is not detuned and emits the HF field with the 13.56 MHz.

If the user of the mobile device 1 moves the mobile device 1 into the HF field of a charge terminal device to charge battery 2 of the mobile device 1, controller stage 19 activates the charge mode with control signals to the first switch stage 6 and the second switch stage 16. The first switch stage 6 is closed by the control signal to short circuit the ports 5 and second switch stage 16 is opened by the control signal to connect the ports 15 with antenna 9. By this short circuit, series capacities 7 and 8 form one capacity parallel to antenna 9 and capacity 10. The second matching unit in the charge mode of the mobile device 1 therefore is built by series capacities 7 and 8 parallel to capacity 10 (not shown in FIG. 3) and antenna 9, which is contacted with ports 15 via series capacities 17 and 18 to charge unit 14. The second matching unit ensures that antenna 9 is tuned at a resonance frequency ident to the carrier frequency of 13.56 MHz of the magnetic field of the charge terminal device. Additional capacities 11 and 12 are connected to communication unit 4 and ensure proper use of the communication unit 4. In this charge mode series capacities 7 and 8 of the first matching unit are used as part of the second matching unit, while parallel capacity 10 is part of both matching units.

Figure 3:
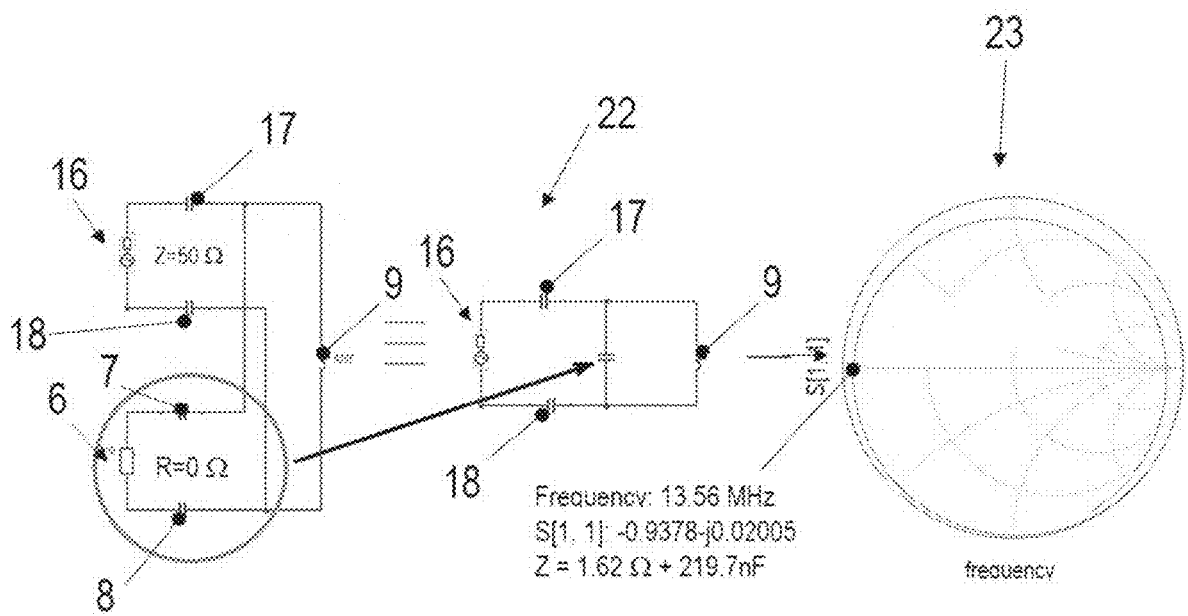
FIG. 3 shows a principle circuit drawing of the second matching circuit connected to the single antenna in the wireless charging mode of the mobile device of FIG. 1.

Therefore FIG. 3 shows in a principle circuit drawing 22 how series capacities 7 and 8 of mobile device 1 of FIG. 1 with the short circuit of the first switch stage 6 (R=0) form a parallel capacity to antenna 9. Frequency diagram 23 shows the complex impedance of the antenna 9 of mobile device 1 in the HF field in its charge mode, which is just as one example with the value Z=1.62Ω+219.7 nF. This impedance of the antenna 9 in charge mode is smaller than the impedance of antenna 9 in the communication mode and charges the HF field of the charge terminal device stronger to harvest as much as possible energy from the HF field to charge battery 2. Furthermore, the resonance frequency of antenna 9 is tuned by the second charge unit to the carrier frequency of the magnetic field and enables to harvest as much a possible energy from the HF field to charge the battery 2. In this way charge stage 13 is optimized for charging of the battery 2.

Figure 4:
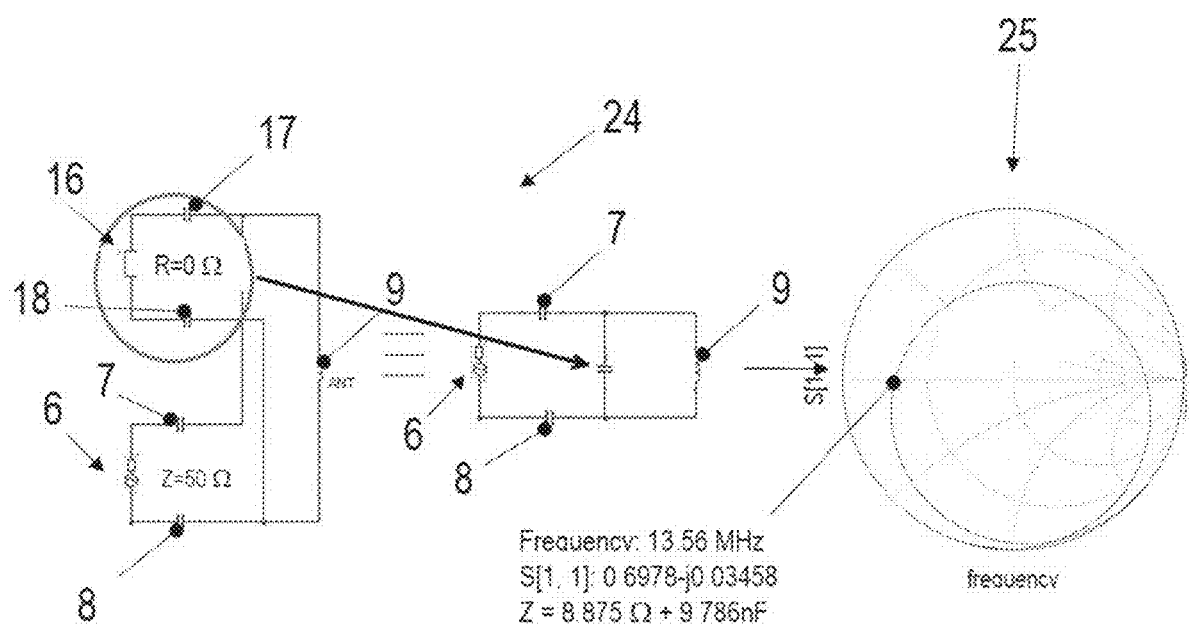
FIG. 4 shows a principle circuit drawing how series capacities form a parallel capacity to the antenna of the mobile device of FIG. 1.

In another embodiment of the invention a mobile device with a communication stage is realized with a first matching unit that tunes the first antenna, and by this optimizes for load modulation communication, at the carrier frequency of 13.56 MHz of the magnetic field of the sales terminal. FIG. 4 shows in a principle circuit drawing 24 how series capacities 17 and 18 of mobile device 1 of FIG. 1 with the short circuit of the second switch stage 16 (R=0) form as part of the first matching unit a parallel capacity to antenna 9. Frequency diagram 25 shows the complex impedance of the antenna 9 of mobile device 1 in the HF field in its communication mode, which is just as one example with the value Z=8.8752Ω+9.786 nF. This embodiment is less preferred than the one shown in FIG. 2 and only possible for antennas with a small form factor to avoid detuning of the carrier frequency.

In a further embodiment of the invention, first and second switch stages could be realized within the first and second matching circuit or even closer to the antenna, but still within the path between the communication unit/charge unit and the antenna. Common for all these further embodiments is, that with the short circuit of the first or second switch stage, the matching unit used for the actual mode of the mobile device is adopted to the needs of the activated application.

In a further embodiment of the invention, the communication unit 4 may be adopted to communicate with the charge terminal during first time periods in the communication mode to e.g. negotiate power needs in the HF field and charge unit 14 may charge the battery 2 in the charge mode of the mobile device 1 in second time periods with the requested HF field strength. In further embodiments of the invention, mobile device could be a wireless earphone and communication unit 4 may be used to receive audio data in the communication mode to be played back with a speaker of the earphone. The wireless earphone may be charged in the charge mode. The communication unit may use load modulation or any other modulation method as well.

In further embodiments of the invention, other frequencies of the electromagnetic field might be used and other matching circuits including coils could be used. Capacities of the matching circuit may be realized as separate components or may be part of an integrated circuit.

In a further embodiment of the invention the communication unit able to process other communication applications and not only used for a payment application. In this embodiment the communication unit is realized to generate the magnetic field with the carrier frequency in a reader mode of the communication stage to read-out information from another listener device realized as tag or smart card. In this way mobile devices like a wrist watch of mobile payment terminal may be used to generate the magnetic field as poller to read out data stored in passive devices.

The invention claimed is:

1. A mobile device for wireless communication with another device and to enable a charge application to charge a battery of the mobile device based on a magnetic field with a specified carrier frequency in the HF frequency area, the mobile device comprising: a communication stage with a communication unit connected via a first matching unit with a first antenna to optimize for a load modulated communication with the other device; and a charge stage with a charge unit connected via a second matching unit with a second antenna to optimize for wireless charging of the battery of the mobile device, wherein: the first and second antennas are realized as only one single antenna; the communication stage comprises a first switch stage arranged in the path between the communication unit and the single antenna and connected directly to two output ports of the communication unit to connect or disconnect the communication unit to/from the single antenna; the charge stage comprises a second switch stage arranged in the path between the charge unit and the single antenna and connected directly to two output ports of the charge unit to connect or disconnect the charge unit to/from the single antenna; the mobile device further comprises a controller stage connected to the first switch stage and the second switch stage to connect the communication unit with and to disconnect the charge unit from the single antenna in a communication mode of the mobile device and to connect the charge unit with and to disconnect the communication unit from the single antenna in a charge mode of the mobile device, wherein the first matching unit and the second matching unit are realized with at least one capacity in common; the first matching unit is built to tune the single antenna at a resonance frequency different than the carrier frequency of 13.56 MHz and that the second matching unit is built to tune the single antenna at a resonance frequency identical to the carrier frequency of 13.56 MHz; and the first switch stage is arranged between output ports of the communication unit and the first matching unit and that the first switch stage is realized to short circuit the output ports of the communication unit in the charge mode of the mobile device.

2. The mobile device according to claim 1, wherein at least one capacity of the first matching unit Via the first switch stage connects to the second matching unit to match the impedance of the charge unit with the impedance of the single antenna in the charge mode of the mobile device.

3. The mobile device according to claim 1, wherein the second switch stage is arranged between output ports of the charge unit and the second matching unit and that the second switch stage is realized to short circuit the output ports of the charge unit in the communication mode of the mobile device.

4. The mobile device according to claim 3, wherein at least one capacity of the second matching unit Via the second switch stage connects to the first matching unit to match the impedance of the communication unit with the impedance of the single antenna in the communication mode of the mobile device.

5. The mobile device according to claim 1, wherein the protocol processed by the communication stage enables contactless payment.

6. The mobile device according to claim 1, wherein the communication unit is realized to generate the magnetic field with the carrier frequency in a reader mode of the communication stage to read-out information from another listener device realized as tag or smart card.

* * * * *